July 21, 1959 I. G. MALOFF 2,896,114
TELEVISION DEFLECTION AND POWER SUPPLY CIRCUITS
Filed April 18, 1957
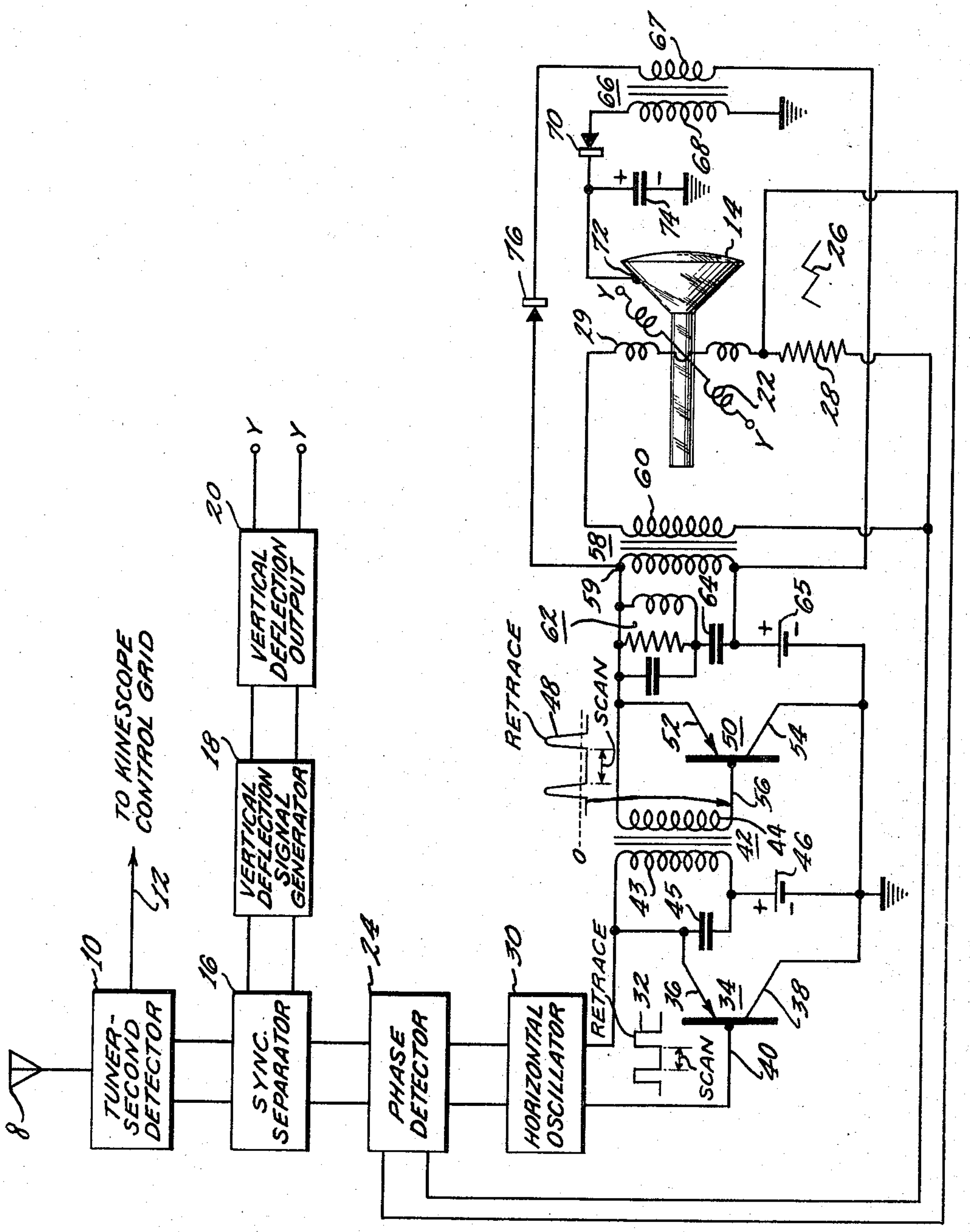
INVENTOR.
Ioury G. Maloff
BY
H. L. Muston
ATTORNEY.

United States Patent Office 2,896,114

Patented July 21, 1959

2,896,114

TELEVISION DEFLECTION AND POWER SUPPLY CIRCUITS

Ioury G. Maloff, Pennsauken, N.J., assignor to Radio Corporation of America, a corporation of Delaware Application April 18, 1957, Serial No. 653,584

10 Claims. (Cl. 315—27)

This invention relates to horizontal deflection and high voltage power supply circuits for television receivers and the like and in particular to such circuits utilizing transistors as active amplifying elements.

Transistors are normally relatively low power devices, especially when compared with vacuum tubes. Accordingly, it has generally been considered necessary to use separate transistors (1) for generating the required deflection current for the horizontal deflection winding of an image reproducing device such as a kinescope and, (2) for developing the required ultor voltage for the kinescope. When attempting to utilize a single output transistor for generating the required deflection current and for developing the required high ultor voltage a condition known as "ringing" has been observed in the high voltage supply which interfers with the deflection circuit. This condition produces undesired effects on the kinescope raster. It would be desirable to generate the required deflection current and develop the required high voltage with one transistor, while preventing ringing in the deflection circuit. In addition to the foregoing objectives, the deflection and high voltage circuits should be arranged, if possible, so that the heat generated during the operation of the circuit, may be transferred as expeditiously as possible, particularly since transistors are temperature sensitive and their operating characteristics vary at elevated operating temperatures.

It is, accordingly, an object of the present invention to provide improved horizontal deflection and high voltage power supply circuits for television receivers and the like.

It is another object of the present invention to provide improved horizontal deflection and high voltage power supply circuits for television receivers and the like wherein a single transistor may be used to provide the required deflection current and high ultor voltage for the television kinescope.

It is yet another object of the present invention to provide an improved horizontal deflection circuit for television receiving systems and the like wherein maximum transfer of generated heat is provided and ringing in the deflection circuit is minimized.

It is still another object of the present invention to provide improved horizontal deflection and high voltage power supply circuits for television receivers and the like wherein the high voltage is isolated from the deflection circuit during the scan or trace portion of the deflection cycle, thereby preventing ringing in the deflection circuit.

A transistor horizontal output circuit includes, in accordance with one feature of the invention, a single transistor which is operated as a common emitter-grounded collector amplifier. Thus, high gain circuit operation is provided and the transistor may be mounted in direct thermal contact with the television chassis for optimum heat transfer.

High voltages for the television image reproducing device or kinescope are derived by rectifying flyback pulses as the output transistor is turned off in response to pulses from the horizontal oscillator. In accordance with another feature of the invention, interaction of the high voltage supply circuit with the deflection circuit and thus ringing of the deflection circuit are prevented by connecting a unilateral conducting device in series between the primary of the deflection transformer and the primary of the high voltage transformer so that the unilateral conducting device conducts during flyback and isolates the high voltage supply circuit from the deflection circuit during the trace or scan portion of the deflection cycle.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing. In the drawing, the single figure is a schematic circuit diagram, partially in block diagram form, of a television receiver which includes horizontal and high voltage power supply circuits embodying the present invention.

Referring now to the drawing in more detail, a television receiver includes an antenna 8, which receives composite television signals and couples the received signals to a tuner-second detector 10. The tuner-second detector 10 would normally include, as is conventional, a radio frequency amplifier, a converter for converting the radio frequency signals to intermediate frequency signals, an intermediate frequency amplifier, a detector for separating the video signals from the intermediate frequency signal, and a video amplifier. The amplified video signal so developed is derived from the output lead 12 and applied to the control grid (not shown) of a television kinescope 14. The video signals are also applied to a sync separator circuit 16 which is connected with the tuner-second detector 10. The sync separator circuit 16 supplies vertical synchronizing pulses to a vertical deflection signal generator 18, which is connected with the sync separator circuit 16. The vertical deflection signal generator 18 is, in turn, connected to a vertical deflection output circuit 20. The vertical deflection output circuit 20 includes a pair of output terminals Y—Y, which are connected to the terminals of a vertical deflection winding 22 of the kinescope 14.

Horizontal synchronizing pulses derived from the sync separator 16 are applied to a phase detector 24, which is connected with the sync separator 16. The phase of the horizontal synchronizing pulses is compared with the phase of a sawtooth current waveform 26, which is developed across a small resistor 28, which is connected in series with the horizontal deflection winding 29.

The resistor 28 may have a resistance of 0.5 ohm, for example, so that the voltage developed across it will have a peak-to-peak value of 1.2 volts. Thus, the effect of the resistor 28 on deflection linearity is negligible, particularly if the deflection winding 29 is not of very low impedance. In the present example and for a circuit actually tested and operated, the deflection winding 29 had an inductance of one millihenry while using a resistor 28 having resistance of 0.5 ohm. The deflection winding 29 would, in this case, reflect a 62 microhenry inductance to the output circuit of the output transistor.

The error voltage developed in the phase detector 24, as a result of the phase comparison between the horizontal synchronizing pulses and the sawtooth wave 26, is applied to a horizontal oscillator 30, which is connected with the phase detector 24. The horizontal oscillator 30 is operative to generate positive pulses 32 in response to this applied error voltage. The output terminals of the horizontal oscillator 30 are connected to the emitter 36 and the base 40 of a driver transistor 34. In this manner, the horizontal oscillator pulses 32 are applied between the emitter 36 and the base 40 of the driver transistor 34. The transistor 34, which in the present example, and by way of illustration only, may be considered to be of the P–N–P junction type, includes, in addition to the emitter 36 and the base 40, a collector electrode 38. The collector 38 of the driver transistor 34 is connected directly to the chassis of the television receiver which is at a point of reference potential or ground.

The output circuit for the driver transistor 34 includes a transformer 42 having a primary winding 43 and a secondary winding 44. The emitter 36 of the driver transistor 34 is connected with the primary winding 43 and a capacitor 45 is connected in parallel with the primary winding 43 to form a tuned primary circuit. To provide forward bias for the driver transistor 34, a battery 46 is provided, the negative terminal of which is connected to chassis ground and the positive terminal of which is connected through the primary winding 43 to the emitter 36. The battery 46 may have in a typical example, a value of 13 volts.

The driver transistor 34 is, as described, connected as a common-emitter grounded-collector amplifier. That is to say, the pulses 32, which are derived from the horizontal oscillator 30, are applied to the input circuit, that is between the emitter 36 and base 40 of the transistor 34, while output signals are derived from between the collector 38 and emitter 36. Accordingly, the emitter 36 is common to the input and output circuits even though the collector 38 is connected directly to ground. In this manner, maximum power gain is obtained and the collector 38 of the transistor 34 may be mounted directly on the chassis without electrical insulation. Thus, a direct low thermal resistance path between the transistor and the chassis is realized and maximum heat transfer is provided. The presence of the driver transistor 34 in the circuit is preferred to achieve higher response time.

Positive pulses 48, which are developed across the output circuit of the driver transistor 34 during the retrace portion of the deflection cycle as the primary winding 43 goes through a period of oscillation and current flow reverses in the transistor 34, are applied through the stepdown transformer 42 between the emitter 52 and the base 56 of an output transistor 50, such that the base 56 is positive. The pulses 48 are in the form of one-half of a sine wave cycle. By transformer coupling the driver stage to the output stage, a direct current axis about 10 to 15 percent above the signal level during the scan portion of the cycle is achieved. Thus, a forward bias equal to approximately one-eighth the peak-to-peak driving amplitude is supplied to the base 56 of the transistor 50. This eliminates the need for an additional bias supply source and protects the output transistor 50 in case of driver failures.

The output transistor 50, which may be considered to be of the P–N–P junction type, includes, in addition to the emitter 52 and the base 56, a collector 54. The collector 54 of the output transistor is connected physically and electrically with the chassis, which is at ground potential, thus providing maximum heat transfer as in the case of the driver transistor 34. The output circuit for the output transistor 50 includes a transformer 58 having a primary winding 59 and a secondary winding 60. This transformer may have a 1 to 4 stepup turns ratio in a typical example. The emitter 52 is connected with one terminal of the primary winding 59. A circuit 62, which is tuned to an odd harmonic of the flyback pulse frequency, and in the present example will be assumed to be tuned to the third harmonic frequency, is connected with the emitter 52, and a capacitor 64 is connected from the other terminal of the third harmonic circuit 62 to the other terminal of the primary winding 59. To provide forward bias for the transistor 50, a battery 65 is provided, the negative terminal of which is connected to the chassis ground and the positive terminal of which is connected through the primary winding 59 to the emitter 52. This battery may also have a value of 13 volts in the present example.

The high voltage circuit for the kinescope 14 includes a high voltage transformer 66 which includes a primary winding 67 and a secondary winding 68. The turns ratio of the high voltage transformer 66 may, for example, be 1 to 110. One terminal of the secondary winding 68 is grounded, while the other terminal is connected through a diode rectifier 70 to the ultor connection 72 of the kinescope 14. A capacitor 74 is connected from the junction of the diode rectifier 70 and the ultor connection 72 to chassis ground. The circuit is completed, and ringing in the deflection circuit is prevented, in accordance with the invention, by connecting a unilateral conducting device, such as a diode 76, in series between the primary winding 59 of the output transformer 58 and the primary winding 67 of the high voltage transformer 66.

In operation, a television signal, which is received by the antenna 8, is amplified and demodulated by the television tuner and second detector 10, which would, as noted above, normally include a radio frequency amplifier, a converter, an intermediate frequency amplifier, a detector and a video amplifier. The video signal appearing at the output lead 12 is then applied to the control grid (not shown) of the kinescope 14. Video signals are also applied to the sync separator circuit 16, which supplies vertical synchronizing signals to the vertical deflection signal generator 18 and horizontal synchronizing pulses to the phase detector 24. Output pulses generated by the vertical deflection generator 18 are supplied to the vertical deflection output circuit 20 which, in turn, supplies a suitable sawtooth of current of field frequency through the vertical deflection winding 22, which is connected across the output terminals Y—Y of the vertical deflection output circuit 20. As was explained hereinbefore, a signal 26, corresponding to the horizontal deflection circuit sawtooth waveform, is developed across the small resistor 28 in the horizontal output circuit and is applied to the phase detector 24. The phase of the signal 26 is compared by the phase detector 24 with the phase of the horizontal synchronizing pulses, which are applied to the phase detector 24 from the sync separator circuit 16. In this way, an error voltage is developed which is dependent on the difference in phase between the horizontal sync pulses and the waveform 26 developed across the resistor 28. This error voltage is applied to the horizontal oscillator 30 and is used to control its frequency.

Horizontal output pulses 32, at a frequency determined by the error voltage which is applied to the horizontal oscillator 30, are applied between the base 40 and emitter 36 of the horizontal driver transistor 34. These pulses are of a positive polarity. The interval between pulses from the horizontal oscillator 30 corresponds to the scan or trace portion of the deflection cycle. During the interval between these pulses the driver transistor 34 is biased for forward conduction and is at saturation. Maximum current thus flows in the collector-emitter circuit in the direction of the emitter arrow and current flow through the primary winding 43 increases in a linear manner. The application of a positive pulse 32 between the emitter and base electrodes of the driver transistor 34 cuts off the driver transistor 34 and reverses the direction of current flow in the collector-emitter circuit of the driver transistor 34. The driver transistor 34 therefore acts like a switch and has a small collector-emitter resistance while saturated and a very large collector-emitter resistance when cut off. The emitter-collector load circuit of the transistor 34 is opened upon application of a positive pulse 32, discharging the energy stored in the primary winding 43 through the capacitor 45. This portion of the cycle corresponds to the retrace portion of the horizontal deflection cycle. A relatively large voltage pulse is developed across the primary winding 43 of the transformer 42. This pulse is stepped down in voltage by the transformer 42 to reduce the circuit impedance, and the positive voltage pulse 48 is applied between the base 56 and emitter 52 electrodes of the horizontal output transistor 50, such that the voltage on the base 56 is positive.

The output transistor 50, which is also operated as a switch, is saturated during the scan or trace portion of the deflection cycle. Maximum current is thus flowing in the collector-emitter circuit and current through the horizontal yoke winding 29 is increasing in a linear manner. During the scan or trace portion of the cycle, damped oscillatory voltages appear across the primary winding 67 of the high voltage transformer 66. Ordinarily these oscillations would be reflected back to the deflection circuit causing ringing in the windings of the horizontal deflection yoke as noted above. This condition causes light and dark lines to appear on the kinescope raster and is undesirable. In accordance with this invention, however, the diode 76 is reverse biased during the scan or trace portion of the cycle. Accordingly, the diode 76 presents in effect, an open circuit between the primary winding 59 of the output transformer 58 and the primary winding 67 of the high voltage transformer 66. Accordingly, the high voltage transformer is isolated from the deflection circuit during scan, thereby preventing damped oscillations from appearing in the deflection circuit and minimizing undesirable ringing.

The application of a positive pulse 48 from the driver transistor 34 between the base and emitter electrodes of the output transistor 50 causes the output transistor to cut off. Current flow through the collector-emitter circuit of the output transistor 50 thus reverses. The collector-emitter load circuit of the output transistor 50 is thus opened, and the energy stored in the primary winding 59 of the output transformer begins to discharge. The relatively large positive voltage pulse thus developed on the emitter 52 forward biases the isolating diode 76. Current thus flows through the diode 76 and the primary the primary winding 67 of the high voltage transformer 66. The voltage developed across the secondary winding 68 of the high voltage transformer is rectified by the high voltage rectifier 70. The resulting charge which is developed across the capacitor 74 is then used to supply a direct-voltage for the ultor connection 72 on the kinescope 14. Thus, during the retrace portion of the deflection cycle, the diode 76 is conductive and the required ultor voltage is supplied to the kinescope 14, while during the trace portion of the cycle, the diode 76 is open circuited and the high voltage circuit is isolated from the deflection circuit.

The positive flyback pulse developed in the output circuit of the output transistor 50 is reduced in amplitude by the tuned circuit 62. The tuned circuit 62 is tuned approximately to the third harmonic of the flyback pulse frequency. The voltage across the tuned circuit 62 is a damped sine wave of the third harmonic frequency which is initiated by the front edge of the flyback pulse. This voltage is 180 degrees out-of-phase with the voltage across the capacitor 64 at the center of the flyback pulse. Accordingly, the voltage across the tuned circuit 62 reduces the amplitude of the peak output voltage of the transistor 50 and prevents breakdown of the output transistor 50.

Transistorized horizontal deflection and high voltage power supply circuits embodying the invention provide a relatively linear sawtooth current through the horizontal deflection winding of a kinescope and, at the same time, an ultor voltage for the kinescope. This is accomplished, moreover, with a single output transistor and without undesired ringing in the deflection circuit. In addition, the circuits are arranged for maximum power gain and heat transfer. The invention thus provides improved performance with circuits which are relatively economical to construct.

What is claimed is:

1. In a television receiver, a horizontal deflection and a high voltage power supply circuit for an electron beam image reproducing device having a horizontal deflection winding, comprising, in combination, a transistor, means for biasing said transistor in the forward direction, means for applying signal energy to said transistor during the retrace portion of the horizontal deflection cycle to reduce current flow thereof, an output transformer including a primary winding connected with said transistor and a secondary winding connected with said deflection winding for supplying a deflection current thereto during the trace portion of the horizontal deflection cycle, a high voltage transformer including a primary winding and a secondary winding, means including a rectifier connecting the secondary winding of said high voltage transformer with said image reproducing device for applying high voltage thereto, and means including a unilateral conducting device connected in series between the primary winding of said output transformer and the primary winding of said high voltage transformer and poled to isolate said high voltage power supply circuit from said deflection circuit during the trace portion of the horizontal deflection cycle.

2. In a television receiver, a horizontal deflection and a high voltage power supply circuit for an image reproducing device having a horizontal deflection winding comprising, in combination, a transistor switch connected for common emitter grounded collector operation and including base, emitter, and collector electrodes, said collector electrode being physically and electrically connected directly to chassis ground for said receiver, input circuit means connected for applying signal energy between said base and emitter electrodes during the retrace portion of the horizontal deflection cycle to reduce current flow of said transistor, an output transformer including a primary and a secondary winding, means providing a source of biasing potential, means connecting said primary winding and said source of biasing potential between said emitter electrode and chassis ground, said source of biasing potential providing forward bias for said transistor and maximum conduction thereof during the trace portion of the deflection cycle, means connecting said secondary winding with said deflection winding for supplying a deflection current thereto during the trace portion of the horizontal deflection cycle, a high voltage transformer including a primary and a secondary winding, means including a rectifier connecting the secondary winding of said high voltage transformer with said image reproducing device for applying a high voltage thereto, and means connecting the primary winding of said output transformer and the primary winding of said high voltage transformer in series to develop said high voltage during the retrace portion of the horizontal deflection cycle.

3. In a television receiver, a horizontal deflection and high voltage power supply circuit for an image reproducing device having a horizontal deflection winding, comprising, in combination, a transistor, means for biasing said transistor in the forward direction to provide maximum conduction thereof during the trace portion of the horizontal deflection cycle, means for applying signal energy to said transistor during the retrace portion of the horizontal deflection cycle of a polarity to reduce current flow thereof, an output transformer including a primary winding connected with said transistor and a secondary winding connected with said deflection winding for supplying a sawtooth deflection current thereto during the trace portion of the horizontal deflection cycle, a high voltage transformer including a primary winding and a secondary winding, means including a rectifier connecting the secondary winding of said high voltage transformer with said image reproducing device, a diode connected in series between the primary winding of said output transformer and the primary winding of said high voltage transformer, said diode being reverse biased during the trace portion of the horizontal deflection cycle to isolate said high voltage power supply circuit from said deflection circuit and forward biased during the retrace portion of the deflection cycle to provide a voltage across said high voltage transformer which is rectified by said rectifier and applied to said image reproducing device.

4. In a television receiver, a horizontal deflection and a high voltage power supply circuit for a kinescope having a horizontal deflection winding, comprising, in combination, a transistor including base, emitter, and collector electrodes, means for applying forward bias to the emitter of said transistor to provide current saturation of said transistor during the trace portion of the horizontal deflection cycle, means for applying signal energy between the base and emitter electrodes of said transistor during the retrace portion of the horizontal deflection cycle to rapidly reduce current flow thereof, an output transformer including a primary winding connected between the collector and emitter electrodes of said transistor and a secondary winding connected with said deflection winding for supplying a sawtooth deflection current thereto during the trace portion of the horizontal deflection cycle, a high voltage transformer including a primary winding and a secondary winding, means including a rectifier connecting said secondary winding with said kinescope for applying a high voltage thereto, and means connecting the primary winding of said output transformer and the primary winding of said high voltage transformer in series including a diode biased in the reverse direction during the trace portion of the deflection cycle to isolate said high voltage power supply circuit from said deflection circuit and in the forward direction during the retrace portion of the deflection cycle to provide current flow from said transistor to the primary winding of said output transformer.

5. In a television receiver a deflection and a high voltage power supply circuit for an image reproducing device having a deflection winding, comprising, in combination, a transistor, means for biasing said transistor in the forward direction, means for applying signal energy to said transistor to reduce current flow thereof, an output transformer including a primary winding connected with said transistor and a secondary winding connected with said deflection winding for supplying a deflection current thereto during the trace portion of the deflection cycle, a high voltage transformer including a primary winding and a secondary winding, means connecting said secondary winding with said image reproducing device for applying a high voltage thereto, and means including a unilateral conducting device connecting the primary winding of said output transformer and the primary winding of said high voltage transformer in series.

6. In a television receiver having a chassis as a circuit ground means, a horizontal deflection and a high voltage power supply circuit for a kinescope having a horizontal deflection winding comprising, in combination, a transistor including base, emitter, and collector electrodes, said collector electrode being physically and electrically connected directly to said chassis, input circuit means connected for applying signal energy between said base and emitter electrodes during the retrace portion of the horizontal deflection cycle and of polarity to reduce current flow of said transistor, an output transformer including a primary and a secondary winding, means providing a source of biasing potential for said transistor, means connecting said primary winding and said source of biasing potential between said emitter electrode and chassis ground, said source of biasing potential providing forward bias for the emitter electrode of said transistor, means connecting said secondary winding with said deflection winding for supplying a sawtooth deflection current thereto during the trace portion of the horizontal deflection cycle, a high voltage transformer including a primary and a secondary winding, means including a rectifier connecting the secondary winding of said high voltage transformer with said image reproducing device for applying a high voltage thereto, and means including a diode connecting the primary winding of said output transformer and the primary winding of said high voltage transformer in series to develop said high voltage during the retrace portion of the horizontal deflection cycle to electrically isolate said high voltage transformer from said output transformer during the trace portion of the horizontal deflection cycle.

7. In a television receiver, a horizontal deflection and a high voltage power supply circuit for an image reproducing device having a horizontal deflection winding comprising, in combination, a driver transistor including base, emitter, and collector electrodes, said collector electrode being connected directly to chassis ground for said receiver for effective electrical and heat conductivity thereto, a horizontal oscillator stage for generating pulses, means connecting said horizontal oscillator stage with said driver transistor for applying said pulses between said base and emitter electrodes during the retrace portion of the horizontal deflection cycle, a first transformer including a primary and a secondary winding, means connecting said primary winding between said emitter and collector electrodes, means connected for applying a forward bias voltage to said transistor, an output transistor including base, emitter, and collector electrodes, the collector electrode of said output transistor being connected directly to chassis ground for effective electrical and heat conduction thereto, means connecting said secondary winding with the base and emitter electrodes of said output transistor for applying pulses thereto during the retrace portion of the horizontal deflection cycle, an output transformer including a primary and a secondary winding, means connecting said primary winding between the emitter and collector electrodes of said output transistor, means connecting the secondary winding of said output transformer with said deflection winding for applying a sawtooth deflection current thereto during the trace portion of the deflection cycle, means connected for applying a forward bias voltage to said output transistor, a high voltage transformer including a primary and a secondary winding of said high voltage transformer with said image reproducing device for applying a high voltage thereto, and means including a diode connecting the primary winding of said output transformer and the primary winding of said high voltage transformer in series to develop said high voltage at the secondary during the retrace portion of the deflection cycle and to isolate said high voltage transformer from said output transformer during the trace portion of the deflection cycle.

8. In a television receiver including a kinescope having a deflection winding, a horizontal deflection and a high voltage power supply circuit comprising, in combination, a transistor connected and biased to be operative at saturation and in a low resistance condition during the trace portion of the horizontal deflection cycle, means for applying input pulses to said transistor during the retrace portion of the input cycle to render said transistor nonconductive and in a relatively high resistance condition, an output transformer including a primary winding connected with said transistor and a secondary winding connected with said deflection winding for supplying a deflection current thereto during the trace portion of the deflection cycle, a high voltage power supply transformer including a primary winding and a secondary winding, means connecting said secondary winding with said kinescope for applying high operating voltages thereto, and a diode connected between the primary winding of said output transformer and the primary winding of said high voltage power supply transformer and defining a series circuit therewith, said diode being poled in said circuit to effect an open circuit between said primary windings during the trace portion of the deflection cycle and a short circuit between said primary windings during the retrace portion of the deflection cycle.

9. In a television receiver including a kinescope having a deflection winding the combination comprising, a transistor including base, emitter, and collector electrodes, an output transformer including a primary winding and a secondary winding, means connecting said primary winding between said emitter and collector electrodes, means providing forward bias for said transistor to provide maximum conduction thereof during the trace portion of the horizontal deflection cycle, means connecting said collector directly to chassis ground for effective electrical and heat conduction thereto, an input transformer including a secondary winding connected between said base and emitter electrodes for applying signal energy thereto during the retrace portion of said deflection cycle of a polarity and amplitude render said transistor nonconductive, means connecting the secondary winding of said output transformer with said deflection winding for supplying a deflection current thereto, a high voltage transformer including a primary and a secondary winding, means connecting the secondary winding of said high voltage transformer with said kinescope, and unilateral conducting means connecting said primary windings in series and poled to isolate said output and high voltage transformers during the trace portion of the deflection cycle.

10. In a television receiver, a horizontal deflection and a high voltage power supply circuit for an image reproducing device having a horizontal deflection winding comprising, in combination, a transistor bidirectional switch connected for common emitter-grounded collector operation and including base, emitter, and collector electrodes, said collector electrode being physically and electrically connected to chassis ground for said receiver, input circuit means connected for applying signal energy between said base and emitter electrodes of a polarity to reduce current flow of said transistor during the retrace portion of the deflection cycle, a voltage supply source poled to apply a forward bias voltage to said transistor to provide maximum conduction thereof during the trace portion of the deflection cycle, output circuit means including said horizontal deflection winding connected with said transistor for applying a deflection current to said deflection winding which increases in a substantially linear manner to provide deflection of an electron beam of said image reproducing device during the trace portion of the horizontal deflection cycle, a high voltage transformer including a primary and a secondary winding, means direct-current conductively connecting said primary winding and said voltage source between said emitter electrode and chassis ground to apply said forward bias voltage to said transistor and defining with at least a portion of said output circuit a series circuit for developing a high voltage during the retrace portion of the deflection cycle, and means including a high voltage rectifier connecting said secondary winding with said image reproducing device for applying said high voltage thereto.

References Cited in the file of this patent

UNITED STATES PATENTS

| | | |
|---|---|---|
| 2,784,262 | Crow | Mar. 5, 1957 |
| 2,794,076 | Shea | May 28, 1957 |
| 2,801,298 | Mital | July 30, 1957 |

OTHER REFERENCES

Herzog et al.: "Transistorized Portable Receiver," Radio-Electronics, January 1955.

Guggi: "CRT Deflection Circuit Has High Efficiency," Electronics, April 1, 1957.